United States Patent Office 2,702,281
Patented Feb. 15, 1955

2,702,281

METHOD FOR PREPARING SOLID SOLUTIONS OF METAL HYDRIDES IN METAL HALIDES

Thomas R. P. Gibb, Jr., Marblehead, Mass., assignor to Metal Hydrides Incorporated, Beverly, Mass., a corporation of Massachusetts No Drawing. Application November 17, 1950, Serial No. 196,347

7 Claims. (Cl. 252—188)

This invention relates to a method for preparing solid solutions of certain metal hydrides in a metal halide or mixture of metal halides.

It is well known that certain pure metals absorb hydrogen at temperatures of the order of 200–400° C. forming hydrides of the composition MH, MH$_2$, etc. where M represents the metal. These hydrides dissociate reversibly at higher temperatures yielding gaseous hydrogen and a solid of lower hydrogen content, e. g. MH$_{0.9}$, MH$_{1.8}$, etc.

Heretofore, it has been proposed to dissolve either lithium hydride or calcium hydride in the molten eutectic of lithium chloride and potassium chloride. This eutectic has a melting temperature of about 352° C. Both lithium hydride and calcium hydride should dissolve in such molten eutectic without appreciable dissociation since the temperature at which the equilibrium pressure equals one atmosphere is about 862° C. for lithium hydride and is about 900° C. for calcium hydride.

The present invention contemplates a method for preparing a substantially homogeneous solution of a metal hydride in a metal halide in which the metal halide has a melting temperature greater than the temperature at which the dissociation pressure of the metal hydride is greater than about one atmosphere.

An attempt to produce a solution of potassium hydride in potassium bromide was described by R. Hilsch in Annalen der Physik, 29, 407–420 (1937). This method comprises subjecting a solid crystal of potassium bromide to the action of potassium metal vapor and hydrogen, the potassium bromide crystal being maintained in solid form at a temperature of 680° C., that is, about 50° C. below its melting temperature. The hydride in this product extended only to about 0.5 mm. below the surface of the crystal.

The present invention is based upon the discoveries (1) that if a metal halide is heated with a hydride forming metal at or above the melting temperature of the metal halide a substantially homogeneous solution of the metal in the halide results and (2) that if the heating of the molten solution is continued in the presence of hydrogen, hydrogen is absorbed to form a substantially homogeneous solution of the metal hydride in the metal halide.

In its general aspect, the method of the present invention comprises heating an anhydrous metal halide in contact with certain hydride forming metals or their hydrides in the presence of hydrogen at least to the melting temperature of the halide to cause solution of the hydride forming metal in the molten halide and until the mass has absorbed a desired amount of hydrogen thereby producing a solution of the metal hydride in the metal halide. The solution then is cooled in the presence of hydrogen. The metal halide used is characterized by having a melting temperature greater than the temperature at which the free metal hydride dissociates appreciably at atmospheric pressure, that is, the temperature at which the dissociation pressure of the metal hydride is greater than about one atmosphere. The method is applicable for preparing solid solutions of the hydrides of the alkali metals, sodium, potassium, rubidium and cesium in metal halides. In order to obtain a solution which contains the stoichiometric hydride, it is desirable to crush the solid solution obtained as above described and again heat it, either with or without additional metal halide, to cause fusion in the presence of hydrogen and until the mass ceases to absorb hydrogen. In the practice of the invention, the hydride forming metal and its hydride are considered full equivalents as starting materials; since if the hydride is used it is largely or wholly dissociated before all of its metal component is dissolved in the halide. Thus, the same result is obtained in substantially the same manner.

In the practice of the invention, the mass should be heated in the exclusive presence of hydrogen or a mixture of an inert gas, such as argon with hydrogen. This may be accomplished by maintaining hydrogen in the reaction zone or retort under a pressure of not less than one atmosphere. However, if the retort in which the reaction is conducted is hermetically sealed or gas tight, a lower pressure may be used. I have found it economically feasible to employ hydrogen at a pressure of about one atmosphere but a higher pressure may be used if desired, such as up to about one hundred atmospheres. These considerations are equally true during the cooling of the solution.

While my investigations have been confined to the preparation of solutions of the hydrides of the metals previously mentioned in a halide of an alkali metal or an alkaline earth metal, I believe other halides may be used which have a melting temperature greater than the temperature at which the free metal hydride dissociates appreciably at atmospheric pressure, the halide being stable under the conditions of the reaction.

The terms "a metal halide" and "a halide of a metal" as used in the appended claims are not intended to exclude a mixture of halides, that is, containing two or more halides each having the same metal ion combined with a different halogen ion or each having a different metal ion combined with the same halogen ion, etc. In any event, the halide or mixture of halides should have a melting temperature greater than the temperature at which the free metal hydride dissociates appreciably at atmospheric pressure.

In accordance with one method embodying the invention a coarsely powdered and substantially completely anhydrous metal halide is mixed with coarsely powdered metal or turnings, chips, etc. The mixing preferably is done in dry hydrogen or argon. When a low melting metal is used an excess over that required is generally used to allow for loss by volatilization. The mixture then is placed in a crucible of an inert metal, such as iron, tungsten or molybdenum, which has previously been cleaned and conditioned preferably by heating to 800° C. with a halide-hydride mixture in hydrogen. The mixture is overlaid with a layer of dry halide, a loose fitting cover put on, and the filled crucible placed in a retort. The retort is evacuated, filled with dry pure hydrogen and heated at least to the melting temperature of the halide. Hydrogen is absorbed during the process but roughly a constant pressure is maintained. The retort is kept at this temperature for a period of time depending largely on the rate of solution of the metal and the size of the container. The time will vary from a few minutes for a 5 cc. crucible to a few hours for large containers. The system is cooled in hydrogen, the retort evacuated, argon admitted, and then the retort is opened cautiously. The fused mass is crushed, mixed thoroughly, and analyzed. It then may be replaced in the crucible, either with or without dilution with more metal halide and treated as before. As the temperature increases additional hydrogen usually is absorbed. After sintering or melting occurs the system is kept at or above this temperature only long enough to ensure uniformity and then it is cooled. Cooling may be at a normal rate if small crystals are desired or very slow if large crystals are needed. The product ordinarily is in the form of clear crystals a few millimeters on a side. These are substantially colorless in the case of alkali metal or alkaline earth metal systems although a faint violet tint is sometimes apparent. The colorless solution indicates that the solution contains the stoichiometric hydride.

In the preparation of a solution of sodium hydride in a halide, it is possible to generate sodium metal in situ by stirring and electrolyzing a molten halide under ordinary conditions employed in the manufacture of sodium. If hydrogen is forced to bubble through this molten system a solution of hydride in halide is formed. This is cooled under hydrogen as before. A second heating usually is unnecessary to secure uniformity. The same considerations apply to other halides, to mixtures of halides, to metals of the alkali and alkaline earth groups and to metals, such as cerium, which are formed electrolytically and which absorb hydrogen exothermically.

The volatility of some metals, such as sodium, may occasion losses from the melts described. Such losses may be minimized by a higher pressure of hydrogen. At one atmosphere pressure of hydrogen, hydride concentrations of the order of one mol per cent of hydride in halide are easily obtained from heating cycles of several hours' duration. Most of the loss of metal by vaporization appears to occur in the initial heating before the metal has dissolved in the halide; losses of metal from the solutions of metal in halide are relatively slight. Thus, a high pressure of hydrogen is most useful during the initial heating when the free metal or hydride is present. At high pressures of hydrogen, the attainable concentration of hydride in halide depends on the mutual solubilities.

A further modification of the method of the invention comprises placing a mixture of metal or metal hydride in a capsule having a thin wall of an inert metal, such as iron, nickel, platinum, etc. which is then closed heremetically, preferably by welding, with hydrogen inside. This may be accomplished by placing a cover upon the top opening of the capsule, the cover having a hollow tube secured to and passing through the cover. Hydrogen is passed through the tube into the capsule as the cover is being welded thereto. A portion of the tube then is heated by the welding torch and closed. The mix may be pelleted beforehand or the metal may be placed on top of the halide. After sealing, the capsule is heated to the melting point of the halide in a retort containing hydrogen substantially exclusively. The metal first hydrides and then dissociates as the temperature increases and the metal diffuses into the halide. As the temperature increases further, the metal wall of the capsule becomes entirely permeable to hydrogen. After the mass is molten it is allowed to remain so until homogeneous. It is then cooled to a temperature of about 500–600° C. and allowed to absorb hydrogen until no more is taken up. It is then reheated to the melting point and the capsule is withdrawn slowly from the heated zone so as to produce large crystals. The hydrogen atmosphere is maintained throughout. If desired, the capsule may be reinforced by keeping it in a porous ceramic or perforated metal basket.

The advantage of the latter method lies in the fact that no material may escape from the sealed capsule. Thus, the composition is easily fixed. The homogeneity of the mass is assured since it may be kept molten over long periods of time without losing metal. If the capsules are properly made and smooth inside, large crystals may be grown within them. The capsule protects the product until time of use.

The product of the invention is useful for many purposes, for example, as a drying agent, condensing agent or reducing agent. As compared to free hydrides, it is less hazardous to handle and possesses greater stability at elevated temperatures.

The invention is illustrated further by the following specific example. 2.3 grams of sodium metal, 1.9 and 2.4 grams of potassium metal were placed in the bottom of separate iron crucibles and covered with 40 grams of sodium chloride, potassium chloride and potassium bromide respectively. The crucibles were covered with loose fitting covers and placed in a furnace and the furnce was evacuated for one hour and hydrogen was admitted. The furnace then was heated to 800° C. and held at that temperature for two hours. Additional hydrogen was introduced periodically to maintain a hydrogen pressure of substantially one atmosphere within the furnace. Hydrogen was absorbed most rapidly near 800° C. The furnace then was cooled to 450° C. over one hour and held at that temperature overnight and then was cooled to room temperature over seven hours, the hydrogen atmosphere being maintained throughout. The crucibles were opened in argon in a dry box and the contents were removed by tapping, ground and analyzed. In each case the material was almost white. The products analyzed as follows:

| Sample | Percent MH (by evolution) | Mol percent MH |
|---|---|---|
| NaCl–NaH | 0.195 | 0.48 |
| KCl–KH | 0.256 | 0.47 |
| KBr–KH | 0.163 | 0.48 |

Portions of each of the above products were diluted with the appropriate halide in amounts calculated to produce 0.1 mol percent and 0.01 mol percent hydride in halide solutions. The mixture was subjected to the heating cycle in hydrogen above described. The products appeared homogeneous, transparent and were in the form of cubic crystals several millimeters on a side.

I claim:

1. The method for producing a solid solution of an alkali metal hydride selected from the group consisting of sodium, potassium, rubidium and cesium hydrides in a halide of a metal selected from the group consisting of alkali metals and alkaline earth metals which comprises heating the halide in contact with the metal of said hydride to the melting temperature of the halide in the presence of hydrogen and continuing the heating until the mass has absorbed a desired amount of hydrogen thereby producing a solution of said hydride in said halide, and thereafter cooling the solution in the presence of hydrogen, said halide being characterized by having a melting temperature greater than the temperature at which the dissociation pressure of the free metal hydride is greater than about one atmosphere.

2. The method for producing a solid solution of an alkali metal hydride selected from the group consisting of sodium, potassium, rubidium and cesium hydrides in a halide of a metal selected from the group consisting of alkali metals and alkaline earth metals which comprises heating the halide in contact with the metal of said hydride to the melting temperature of the halide in the presence of hydrogen and continuing the heating until the mass has absorbed a desired amount of hydrogen thereby producing a solution of said hydride in said halide, thereafter cooling the solution in the presence of hydrogen, said halide being characterized by having a melting temperature greater than the temperature at which the dissociation pressure of the free metal hydride is greater than about one atmosphere, crushing the solution, then heating it to cause fusion in the presence of hydrogen and continuing the heating until the mass ceases to absorb hydrogen, and then cooling the mass in the presence of hydrogen.

3. The method of producing a solid solution of potassium hydride in a halide of a metal selected from the group consisting of alkali metals and alkaline earth metals which comprises heating the halide in contact with the metal of said hydride to the melting temperature of the halide in the presence of hydrogen and continuing the heating until the mass has absorbed a desired amount of hydrogen thereby producing a solution of said hydride in said halide, and thereafter cooling the solution in the presence of hydrogen, said halide being characterized by having a melting temperature greater than the temperature at which the dissociation pressure of free potassium hydride is greater than about one atmosphere.

4. The method for producing a solid solution of sodium hydride in a halide of a metal selected from the group consisting of alkali metals and alkaline earth metals which comprises heating the halide in contact with the metal of said hydride to the melting temperature of the halide in the presence of hydrogen and continuing the heating until the mass has absorbed a desired amount of hydrogen thereby producing a solution of said hydride in said halide, and thereafter cooling the solution in the presence of hydrogen, said halide being characterized by having a melting temperature greater than the temperature at which the dissociation pressure of free sodium hydride is greater than about one atmosphere.

5. The method for producing a solid solution of potassium hydride in a halide of a metal selected from the group consisting of alkali metals and alkaline earth metals which comprises heating the halide in contact with the metal of said hydride to the melting temperature of the halide in the presence of hydrogen and continuing the heating until the mass has absorbed a desired amount of hydrogen thereby producing a solution of said hydride in said halide, thereafter cooling the solution in the presence of hydrogen, said halide being characterized by having a melting temperature greater than the temperature at which the dissociation pressure of free potassium hydride is greater than about one atmosphere, crushing the solution, then heating it to cause fusion in the presence of hydrogen and continuing the heating until the mass ceases to absorb hydrogen, and then cooling the mass in the presence of hydrogen.

6. The method for producing a solid solution of sodium hydride in a halide of a metal selected from the group consisting of alkali metals and alkaline earth metals which comprises heating the halide in contact with the metal of said hydride to the melting temperature of the halide in the presence of hydrogen and continuing the heating until the mass has absorbed a desired amount of hydrogen thereby producing a solution of said hydride in said halide, thereafter cooling the solution in the presence of hydrogen, said halide being characterized by having a melting temperature greater than the temperature at which the dissociation pressure of free sodium hydride is greater than about one atmosphere, crushing the solution, then heating it to cause fusion in the presence of hydrogen and continuing the heating until the mass ceases to absorb hydrogen, and then cooling the mass in the presence of hydrogen.

7. The method for producing a solid solution of an alkali metal hydride selected from the group consisting of sodium, potassium, rubidium and cesium hydrides in a halide of a metal selected from the group consisting of alkali metals and alkaline earth metals which comprises placing the halide and the metal of said hydride in an inert metal capsule, filling the capsule with hydrogen and hermetically sealing the capsule, heating the thus prepared capsule in a reaction zone containing hydrogen to cause fusion of the halide and obtain a homogeneous mass, then cooling the mass and maintaining it in the reaction zone in the presence of hydrogen at a temperature of about 500° C. to 600° C. until hydrogen ceases to be absorbed, then heating the capsule in the reaction zone in the presence of hydrogen to melt the mass, and thereafter cooling the capsule in the presence of hydrogen, said halide being characterized by having a melting temperature greater than the temperature at which the dissociation pressure of the free metal hydride is greater than about one atmosphere.

References Cited in the file of this patent

FOREIGN PATENTS 496,294    Great Britain ---------- Nov. 29, 1938